United States Patent
Siddiqui et al.

(10) Patent No.: US 10,386,898 B2
(45) Date of Patent: Aug. 20, 2019

(54) THERMAL DOCK FOR A MOBILE COMPUTING DEVICE

(71) Applicant: Microsoft Technology Licensing, LLC, Redmond, WA (US)

(72) Inventors: Kabir Siddiqui, Sammamish, WA (US); Jedd Perry, Monroe, WA (US); Andrew Douglas Delano, Woodinville, WA (US); David William Voth, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/899,606

(22) Filed: Feb. 20, 2018

(65) Prior Publication Data

US 2018/0239404 A1     Aug. 23, 2018

Related U.S. Application Data

(60) Provisional application No. 62/462,339, filed on Feb. 22, 2017.

(51) Int. Cl.
    *G06F 1/16*        (2006.01)
    *G06F 1/20*        (2006.01)

(52) U.S. Cl.
    CPC ............ *G06F 1/203* (2013.01); *G06F 1/1632* (2013.01); *G06F 1/206* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,704,212 | A | * | 1/1998 | Erler | F25B 21/04 361/679.41 |
| 5,974,556 | A | * | 10/1999 | Jackson | G06F 1/203 713/322 |
| 6,109,039 | A | * | 8/2000 | Hougham | G06F 1/203 62/259.2 |

(Continued)

FOREIGN PATENT DOCUMENTS

| | | |
|---|---|---|
| CN | 201698310 U | 1/2011 |
| GB | 2524248 A | 9/2015 |

OTHER PUBLICATIONS

"International Search Report and Written Opinion Issued in PCT Application No. PCT/US2018/018788", dated Apr. 6, 2018, 12 Pages.

(Continued)

*Primary Examiner* — Lisa Lea-Edmonds
(74) *Attorney, Agent, or Firm* — Ray Quinney & Nebeker P.C.; Paul N. Taylor

(57) ABSTRACT

Thermal management systems and corresponding use methods are described herein. A thermal management system includes a thermal dock operable to cool a computing device in physical contact with the thermal dock. The thermal dock includes a housing, a first thermal management device supported by the housing, and a second thermal management device physically connected to the first thermal management device. The first thermal management device is a different type of thermal management device than the second thermal management device.

22 Claims, 15 Drawing Sheets

(56) References Cited

U.S. PATENT DOCUMENTS

| | | | |
|---|---|---|---|
| 6,181,553 B1* | 1/2001 | Cipolla | G06F 1/1632 165/104.33 |
| 6,191,943 B1* | 2/2001 | Tracy | G06F 1/1632 361/679.46 |
| 6,219,233 B1* | 4/2001 | Moore | G06F 1/1632 361/679.47 |
| 6,255,622 B1* | 7/2001 | May | G06F 1/203 219/201 |
| 6,256,193 B1* | 7/2001 | Janik | A47B 23/043 248/922 |
| 6,276,448 B1* | 8/2001 | Maruno | G06F 1/1632 165/104.33 |
| 6,313,987 B1* | 11/2001 | O'Connor | G06F 1/1632 165/104.33 |
| 6,362,959 B2* | 3/2002 | Tracy | G06F 1/1632 361/679.47 |
| 6,415,612 B1* | 7/2002 | Pokharna | F25B 21/02 165/80.2 |
| 6,459,574 B1* | 10/2002 | Ghosh | G06F 1/1632 165/80.4 |
| 6,605,924 B2* | 8/2003 | Tanaka | G06F 1/1632 320/113 |
| 6,687,123 B2* | 2/2004 | Kitahara | G06F 1/1632 165/121 |
| 6,837,057 B2* | 1/2005 | Pokharna | G06F 1/203 361/679.41 |
| 6,837,058 B1 | 1/2005 | McEuen et al. | |
| 6,856,921 B2* | 2/2005 | Cohen | G06F 1/20 257/E23.082 |
| 7,472,215 B1* | 12/2008 | Mok | G06F 1/1632 710/304 |
| 7,660,930 B2* | 2/2010 | Mok | G06F 1/1632 710/304 |
| 7,676,619 B2* | 3/2010 | Mok | G06F 1/1632 710/304 |
| 7,676,620 B2* | 3/2010 | Mok | G06F 1/1632 710/304 |
| 7,694,057 B2* | 4/2010 | Mok | G06F 1/1632 710/304 |
| 7,702,837 B2* | 4/2010 | Mok | G06F 1/1632 710/304 |
| 7,711,884 B2* | 5/2010 | Mok | G06F 1/1632 710/304 |
| 7,739,439 B2* | 6/2010 | Mok | G06F 1/1632 710/304 |
| 7,761,641 B2* | 7/2010 | Mok | G06F 1/1632 710/304 |
| 7,788,436 B2* | 8/2010 | Mok | G06F 1/1632 710/304 |
| 7,793,027 B2* | 9/2010 | Mok | G06F 1/1632 710/304 |
| 7,843,691 B2 | 11/2010 | Reichert et al. | |
| 7,925,813 B2* | 4/2011 | Mok | G06F 1/1632 710/304 |
| 7,974,090 B2* | 7/2011 | Risher-Kelly | G06F 1/1632 165/185 |
| 9,300,342 B2 | 3/2016 | Schlub et al. | |
| 9,921,618 B2* | 3/2018 | Magi | G06F 1/1632 |
| 10,007,298 B2* | 6/2018 | Shibayama | G06F 1/1616 |
| 2001/0007525 A1 | 7/2001 | Tracy | |
| 2001/0033475 A1* | 10/2001 | Lillios | G06F 1/1632 361/679.54 |
| 2004/0130870 A1* | 7/2004 | Fleck | G06F 1/1632 361/679.41 |
| 2005/0217278 A1 | 10/2005 | Mongia et al. | |
| 2013/0135214 A1 | 5/2013 | Li et al. | |
| 2014/0062392 A1 | 3/2014 | Lofy et al. | |
| 2014/0098486 A1 | 4/2014 | Davis | |
| 2014/0192480 A1 | 7/2014 | Winkler et al. | |
| 2015/0192971 A1 | 7/2015 | Shah | |
| 2017/0168531 A1* | 6/2017 | Casparian | G06F 1/206 |
| 2017/0273214 A1* | 9/2017 | Casparian | G06F 1/203 |

OTHER PUBLICATIONS

Gurrum, et al., "Generic Thermal Analysis for Phone and Tablet Systems", In Proceedings of IEEE 62nd Electronic Components and Technology Conference, May 29, 2012, pp. 1488-1492.

* cited by examiner

THERMAL DOCK FOR A MOBILE COMPUTING DEVICE

PRIORITY

This application claims the benefit of U.S. Provisional Application Ser. No. 62/462,339, filed on Feb. 22, 2017, which is hereby incorporated by reference in its entirety.

BRIEF DESCRIPTION OF THE DRAWINGS

For a more complete understanding of the disclosure, reference is made to the following detailed description and accompanying drawing figures, in which like reference numerals may be used to identify like elements in the figures.

Figure 1:
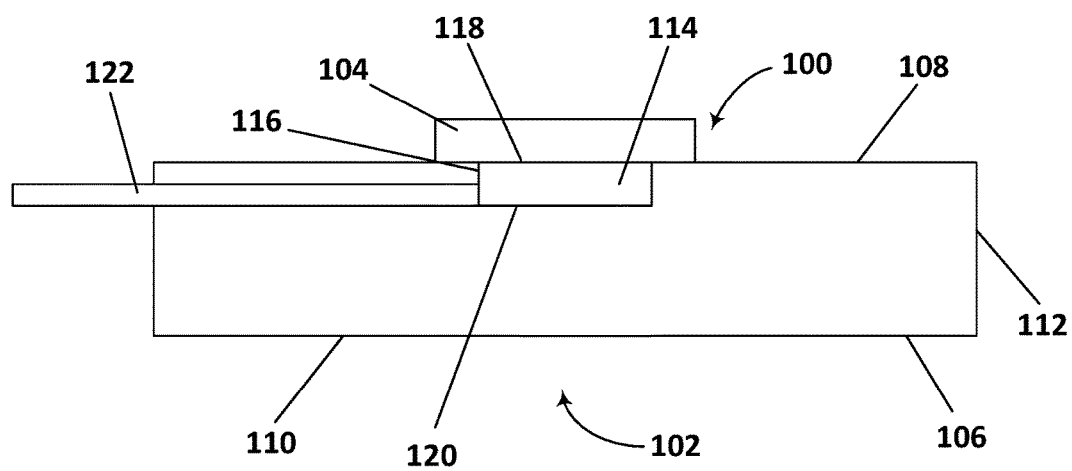
FIG. 1 depicts a front view of an example of a thermal management system.

While the disclosed devices, systems, and methods are representative of embodiments in various forms, specific embodiments are illustrated in the drawings (and are hereafter described), with the understanding that the disclosure is intended to be illustrative, and is not intended to limit the claim scope to the specific embodiments described and illustrated herein

DETAILED DESCRIPTION

Current microprocessor design trends include designs having an increase in power, a decrease in size, and an increase in speed. This results in higher power in a smaller, faster microprocessor. Another trend is towards lightweight and compact electronic devices. As microprocessors become lighter, smaller, and more powerful, the microprocessors also generate more heat in a smaller space, making thermal management a greater concern than before.

The purpose of thermal management is to maintain the temperature of a device within a moderate range. During operation, electronic devices dissipate power as heat that is to be removed from the device. Otherwise, the electronic device will get hotter and hotter until the electronic device fails, reducing service life of the electronic device. Short of failure, electronic devices run slowly and dissipate power poorly at high temperatures.

As devices get smaller (e.g., thinner), thermal management becomes more of an issue. Depending on the thickness of the device, there may not be sufficient room within the device for active thermal management components such as, for example, fans. Also, as mobile devices (e.g., phones and tablets) replace larger laptop and desktop computers, the microprocessors may sometimes be tasked with running a full desktop environment and may thus generate more heat. The mobile device may be positioned on a thermal dock to remove enough heat from the mobile device so that the mobile device may run the full desktop environment.

Disclosed herein are apparatuses, systems, and methods for improved heat dissipation from an electronic device. The improved heat dissipation within the electronic device may be provided by a thermal dock including an active cooling device (e.g., a Peltier device) that is physically connected (e.g., at a hot side of the Peltier device) to a spring-loaded heat sink. Magnets located on a computing device (e.g., a back side of the computing device, opposite a display of the computing device) to be cooled and the thermal dock, respectively, keep the back side of the computing device in physical contact with the Peltier device. The thermal dock also includes one or more fans positioned in line with the heat sink to cool the heat sink and thus the hot side of the Peltier device physically connected to the heat sink.

When the computing device is docked with the thermal dock, data may be transmitted between the computing device and the thermal dock via respective transceiver modules. The transceiver modules include locating features (e.g., a protrusion and a recess) to locate the computing device relative to the thermal dock, and, more specifically, the transceiver modules relative to each other, such that communication between the computing device and the thermal dock is possible.

As an example, the improved heat dissipation for a computing device may be implemented with a thermal dock operable to cool a computing device that is in physical contact with the thermal dock. The thermal dock includes a housing, a first thermal management device supported by the housing, and a second thermal management device physically connected to the first thermal management device. The first thermal management device is a different type of thermal management device than the second thermal management device.

Such heat dissipation apparatuses, systems, or methods have several potential end-uses or applications, including any mobile device to be cooled. For example, the thermal dock may be used to cool personal computers, tablet or other handheld computing devices, laptop or mobile computers, communications devices such as mobile phones, multiprocessor systems, microprocessor-based systems, programmable consumer electronics, minicomputers, or audio or video media players. In certain examples, the thermal dock may be used to cool a wearable electronic device, where the device may be worn on or attached to a person's body or clothing. The wearable device may be attached to a person's shirt or jacket; worn on a person's wrist, ankle, waist, or head; or worn over the person's eyes or ears. Such wearable devices may include a watch, heart-rate monitor, activity tracker, or head-mounted display.

Using one or more of these features described in greater detail below, improved heat dissipation may be provided for the electronic device. With the improved heat dissipation feature, a more powerful microprocessor may be installed for the electronic device, a thinner electronic device may be designed, a higher processing speed may be provided, or a combination thereof may be provided when compared to a similar electronic device without one or more of the improved heat dissipation features. In other words, the heat dissipation features described herein may provide improved thermal management for an electronic device such as a mobile phone, tablet computer, or laptop computer.

FIG. 1 depicts a front view of an example of a thermal management system 100. The thermal management system 100 includes a heat sink device 102 (e.g., a thermal dock) and components of an electronic device 104. The heat sink device 102 is, for example, a thermal dock on which the electronic device 104 may be positioned. The thermal dock 102 includes a housing 106 having a first side 108 (e.g., a top), a second side 110 (e.g., a bottom), and at least one third side 112 (e.g., a side) extending between the first side 108 and the second side 110. The housing 106 supports a heat sink 114. In the example shown in FIG. 1, the housing 106 includes a recess or an opening 116 in which the heat sink 114 is supported. The heat sink 114 is positioned in the housing 106 such that a top 118 of the heat sink 114 is flush with or above the top 108 of the housing 106. In other examples, the recess 116 is on other sides and/or located at other positions within the housing 106. In one example, the housing 106 itself acts as the heat sink device. For example, the heat sink device 102 is a solid or hollow piece of thermally conductive material on which the electronic device 104 is positioned.

The housing 106 may be made of any number of materials. For example, the housing 106 is made of any number of thermally conductive materials such as, for example, copper or aluminum. Alternatively or additionally, the housing 106 may be at least partially made of any number of insulators including, for example, plastics. In one example, the housing 106 is made of a solid piece of material (e.g., a thermally conductive material such as aluminum). In another example, the housing 106 is hollow and is made of an insulator (e.g., plastic). In one example, at least one side of the housing 106 is open to provide access inside the heat sink device 102. For example, the housing 106 is hollow, and a first side and a second side opposite the first side, which extend between the top 108 and the bottom 110 of the housing 106, are open. This configuration of the housing allows air flow through the heat sink device 102.

In the example shown in FIG. 1, the heat sink 114 is a Peltier device. In other examples, the housing 106 may support other heat sinks such as one or more phase change devices (e.g., a heat pipe and/or a vapor chamber) and/or a plurality of fins. A Peltier device is a solid-state heat pump that transfers heat from one side of a device to another. The direction of the heat transfer depends on the direction of current through the Peltier device. Peltier devices include two different types of semiconductors (e.g., an n-type semiconductor and a p-type semiconductor) with different electron densities. The semiconductors are joined with a layer of thermally conductive material (e.g., aluminum or copper) on each of two sides of the semiconductors. The semiconductors are electrically in series. Voltage is applied to the semiconductors, and DC current flows across a junction of the semiconductors. This causes a temperature difference. The cold side absorbs heat and moves the heat to the hot side. A plurality of fins may be disposed on the hot side (e.g., extend away from the layer of thermally conductive material on the hot side). The plurality of fins help remove heat from the hot side. Different Peltier devices may produce different maximum temperature differences between the cold side and the hot side. The fins on the hot side may help decrease the temperature on the hot side and thus, also on the cold side. Peltier devices also have different power ratings that correspond to the rate at which the cold side cools down an object thermally connected to the Peltier device (e.g., the electronic device 104).

Current runs through the Peltier device 114 such that the top 118 is the cold side and a bottom 120 of the Peltier device 114 is the hot side. Other configurations may be provided. Power is provided to the Peltier device 114 via cables 122 (e.g., a positive cable and a negative cable) extending through the housing 106 of the heat sink device 102. In one example, the heat sink device 102 includes a power supply unit and/or one or more batteries.

Different Peltier devices with different maximum temperature differences and different power ratings may be selected for different thermal docks depending on the device to be cooled. As an example, the electronic device 104 is a mobile device (e.g., a phone or a tablet), and the Peltier device 114 positioned within the housing 106 is selected such that a processor within the mobile device 104 is cool enough to operate a desktop environment when the mobile device 104 is positioned on the Peltier device 114.

The heat sink device 102 may include any number of additional and/or different components. For example, the heat sink device 102 may include one or more fans supported by the housing 106 (e.g., positioned in the housing 106). The one or more fans may move air through the plurality of fins extending away from the hot side to aid in heat removal away from the hot side.

Figure 2:
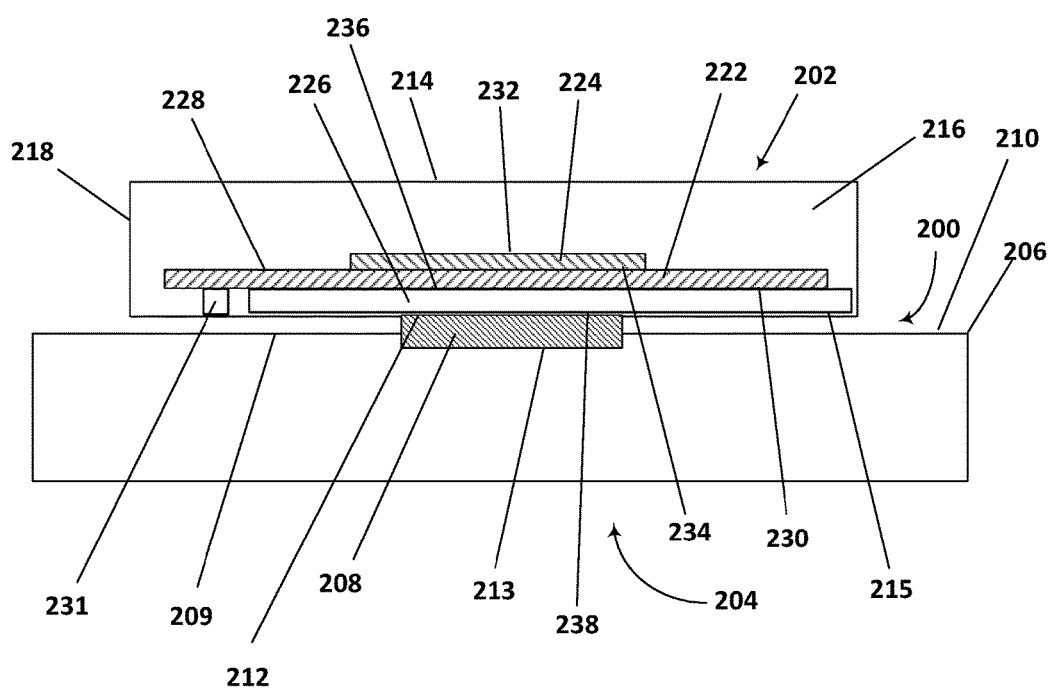
FIG. 2 depicts a cross section of a portion of an example of a thermal management system.

FIG. 2 depicts a cross section of a portion of an example of a thermal management system 200. The thermal management system 200 includes a portion of an electronic device 202 (e.g., a mobile device such as a mobile phone or a tablet) and a portion of a heat sink device 204. In the example shown in FIG. 2, the heat sink device 204 includes a housing 206 and a Peltier device 208 supported by the housing 206. The housing 206 may include a recess or an opening (see FIG. 1) in which the Peltier device 208 is supported and disposed. The Peltier device 208 may be supported by the housing 206 in any number of other ways including, for example, by being physically attached to an inner surface 209 or an outer surface 210 (e.g., a top surface) of the housing 206.

The Peltier device 208 includes a first side 212 (e.g., a top) and a second side 213 (e.g., a bottom). In the example shown in FIG. 2, the first side 212 is a cold side of the Peltier device 208 and is a side closest to a device (e.g., the mobile device 202) docking with the heat sink device 204. The first side 212 of the Peltier device 208 may be positioned above the top surface 210 of the housing 206 of the heat sink device 204 such that the first side 212 of the Peltier device 208 abuts a surface of the electronic device 202 (e.g., a first side or top 214 or a second side or bottom 215) when the electronic device 202 is docked with the heat sink device 204.

The electronic device 202 includes a housing 216 having the first side 214 (e.g., the top), the second side 215 (e.g., the bottom), and at least one third side 218 extending between the first side 214 and the second side 215. In the example shown in FIG. 2, the electronic device 202 is a mobile phone, the first side 214 is part of a display of the mobile phone 202, and the second side 215 is part of a chassis of the mobile phone 202.

The mobile phone 202, for example, includes a printed circuit board (PCB) 222, one or more heat generating components 224 (e.g., a processor), and a heat spreader 226 (e.g., a phase change device). The PCB 222, the processor 224, and the heat spreader 226 are supported by the housing 216 of the mobile phone 202. In the example shown in FIG. 2, the PCB 222, the processor 224, and the heat spreader 226 are supported entirely within the housing 216 of the mobile phone 202. For example, the PCB 222 may be physically connected to an inner surface of the housing 216 using one or more connectors including, for example, screws, nut/bolt combinations, flanges, tabs, and/or other connectors, and the processor 224 and the heat spreader 226 may be supported by the PCB 222. In other examples, the housing 216 directly supports the heat spreader 226 with one or more connectors including, for example, screws, nut/bolt combinations, flanges, tabs, an adhesive, and/or other connectors. The mobile phone 202 may include any number of additional and/or different components including, for example, one or more fans, a power supply, memory, display components, and/or other components.

The example of FIG. 2 shows a single PCB 222 with components on both sides of the PCB 222 (e.g., a first side or a top 228 of the PCB 222 and a second side or a bottom 230 of the PCB 222). The PCB 222 may support other and/or different components on the first side 228 of the PCB 222 and/or the second side 230 of the PCB 222. For example, as shown in FIG. 2, the PCB 222 may also support and electrically connect a transceiver module 231 on the second side 230 of the PCB 222. The transceiver module 231 may be offset relative to the heat spreader 226, as shown in FIG. 2, or may extend through the heat spreader 226. The transceiver module 231 may be any number of different types of transceiver modules 231 including, for example, an optical transceiver module, an RF transceiver module, or another type of transceiver module. The transceiver module 231 may extend to a position at or adjacent to the second side 215 of the housing 216 of the mobile phone 202, such that the transceiver module 231 may communicate with another transceiver module (e.g., a transceiver module of the heat sink device 102). For example, the transceiver module 231 may physically and/or electrically connect with the other transceiver module to communicate.

The processor 224 may, for example, be an integrated circuit and may be in die form or in package form. The processor 224 includes a first side 232 (e.g., a top or an exposed side) and a second side 234 (e.g., a bottom). The second side 234 of the processor 224 abuts the first side 228 of the PCB 222. The processor 224 is physically attached to and electrically connected to the PCB 222 in any number of ways including, for example, with solder. The processor 224 may be physically attached directly to the PCB 222, or one or more intervening components may be disposed between the processor 224 and the PCB 222. In one example, the processor 224 of FIG. 2 represents more than one heat generating component, and each of the heat generating components is physically attached to and electrically connected to the PCB 222.

The heat spreader 226 includes a first side 236 (e.g., a top) and a second side 238 (e.g., a bottom). The first side 236 of the heat spreader 226 is physically connected to and/or abuts the second side 230 of the PCB 222. In one example, the heat spreader 226 is physically attached directly to the PCB 222 with, for example, one or more connectors and/or and adhesive. In another example, one or more intervening components and/or layers of material are disposed between the heat spreader 226 and the PCB 222. The heat spreader 226 may extend across the entire PCB 222 or may extend across less than all of the PCB 222.

The heat spreader 226 may be, for example, a solid piece of thermally conductive material (e.g., copper or a graphite-based material), a heat pipe, and/or a vapor chamber. The exposed side 232 of the processor 224 may be formed by an insulator such that heat generated by the processor 224 is conducted through and spread out along the PCB 222. The heat spreader 226 further aids in the spreading of the heat generated by the processor 224 along the length of the mobile phone 202.

Figure 3:
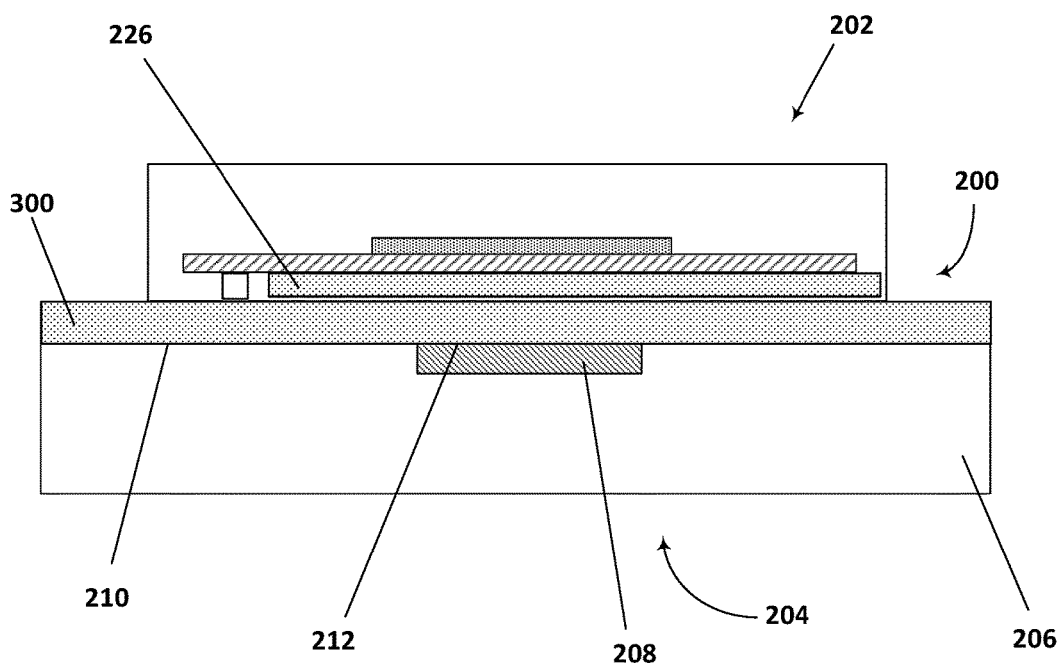
FIG. 3 depicts a cross section of a portion of another example of the thermal management system.

In one example, the heat sink device 204 includes a heat spreader. FIG. 3 depicts a cross section of a portion of another example of the thermal management system 200. The heat sink device 204 includes a heat spreader 300. The heat spreader 300 may extend across the entire surface area of the top surface 210 of the heat sink device 204 or less than all of the surface area of the top surface 210 of the heat sink device 204. The first side 212 of the Peltier device 208 is flush with the top surface 210 of the housing 206 of the heat sink device 204, and the heat spreader 300 is physically attached to the first side 212 of the Peltier device 208 and/or the top surface 210 of the housing 206. The heat spreader 300 may be physically connected to the Peltier device 208 and/or the housing 206 in any number of ways including, for example, with connectors and/or an adhesive (e.g., a thermal glue).

The heat spreader 300 may be a phase change device or a piece of thermally conducting material. For example, the phase change device may be a heat pipe, a vapor chamber, or a solid piece of copper or a graphite-based material. The heat spreader 300 of the heat sink device 204 may be instead of or in addition to the heat spreader 226 of the electronic device 202. The heat spreader 300 may be made of the same material or a different material than the heat spreader 226. In one example, the heat spreader 300 and the heat spreader 226 are both made of a graphite-based material (e.g., graphene).

Figure 4:
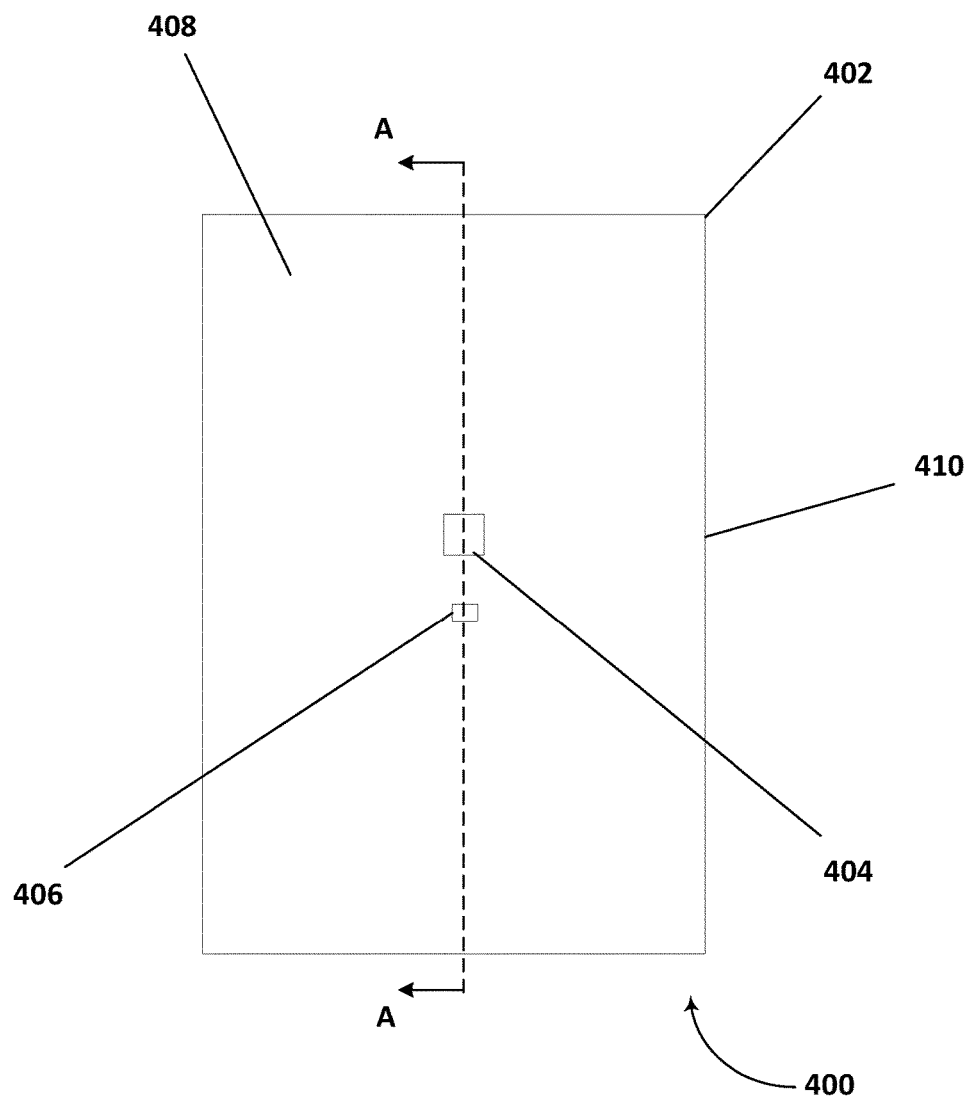
FIG. 4 depicts a top view of one example of a heat sink device.

FIG. 4 depicts a top view of one example of a heat sink device 400 (e.g., a thermal dock). The thermal dock 400 includes a housing 402, and a Peltier device 404 and a transceiver module 406 supported by the housing 402. The housing 402 is hollow and has a top 408, a bottom (not shown), and four sides 410 extending between the top 408 and the bottom. In the example shown in FIG. 4, the housing 402 is rectangular in shape, but the housing 402 may be any number of other shapes. The housing 402 may be made of any number of materials including, for example, aluminum or plastic.

Figure 5:
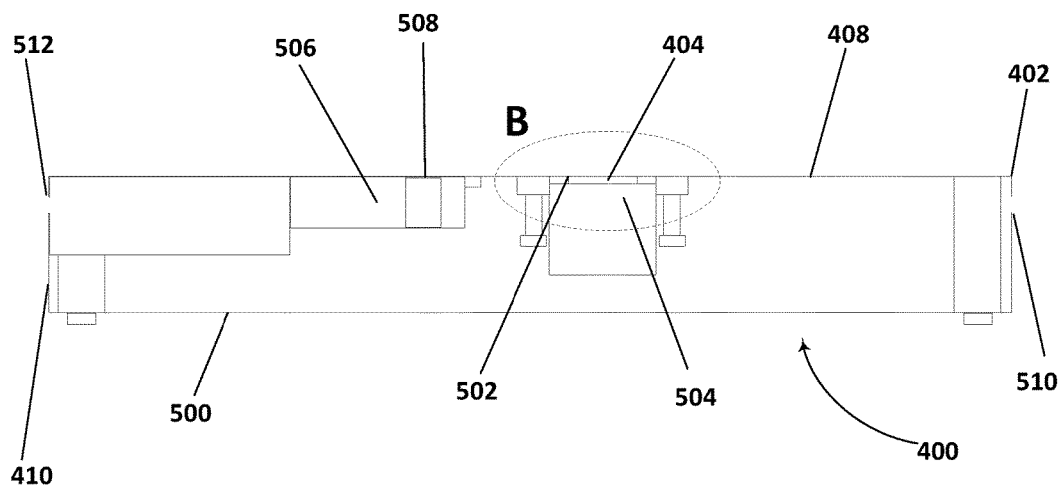
FIG. 5 depicts cross section A-A of the example of the heat sink device of FIG. 4.

FIG. 5 depicts cross section A-A of the example of the heat sink device 400 of FIG. 4. The housing 402 further includes a bottom 500, with the four sides 410 extending between the top 408 and the bottom 500. The Peltier device 404 is supported at the top 408 of the heat sink device 400. The top 408 of the heat sink device 400 includes an opening 502 through which the Peltier device 404 extends. The Peltier device 404 is supported at the top 408 of the heat sink device 400 with a heat sink 504 that is physically connected to the housing 402 of the heat sink device 400. For example, as shown in the example of FIG. 5, the heat sink 504 is physically connected at or adjacent to the top 408 of the heat sink device 400. In other examples, the heat sink 504 and the Peltier device 404 may be supported at other sides of the heat sink device 400.

The heat sink device 400 also includes one or more fans 506 (e.g., a fan). The fan 506 may be any number of types of fans. In one example, the fan 506 is an axial fan. Other types of fans may be provided. The fan 506 may be any number of sizes. The size of the fan 506 may be set based on a maximum power of the Peltier device 404 or a maximum amount of heat to be dissipated by the heat sink device 400. In the example shown in FIG. 5, the fan 506 is supported at or adjacent to the top 408 and/or one or more of the sides 410 of the housing 402. For example, the fan 506 is physically connected to the housing 402, adjacent to the top 408 of the housing 402 with one or more connectors 508 (e.g., screws, nut/bolt combinations, tapped recesses). In other examples, the fan 506 is physically connected to other portions of the housing 402 (e.g., the bottom 500 of the housing 402). The fan 506 is aligned with a portion of the heat sink 504 (e.g., fins of the heat sink 504) and/or with one or more outlet vents 510 through the housing 402 of the heat sink device 400. Cooling air is pulled into the housing 402 through inlet vents 512 by the fan 506, and the cooling air is pushed through the heat sink 504 (e.g., the fins of the heat sink 504) and out of the outlet vents 510 through the housing 402. In one example, a speed of the fan 506 is controlled by a processor of the heat sink device 400 (not shown) or a processor of a computing device supported by and in communication with the heat sink device 400. In another example, the speed of the fan 506 is set to one speed and remains at the speed while powered on.

Figure 6:
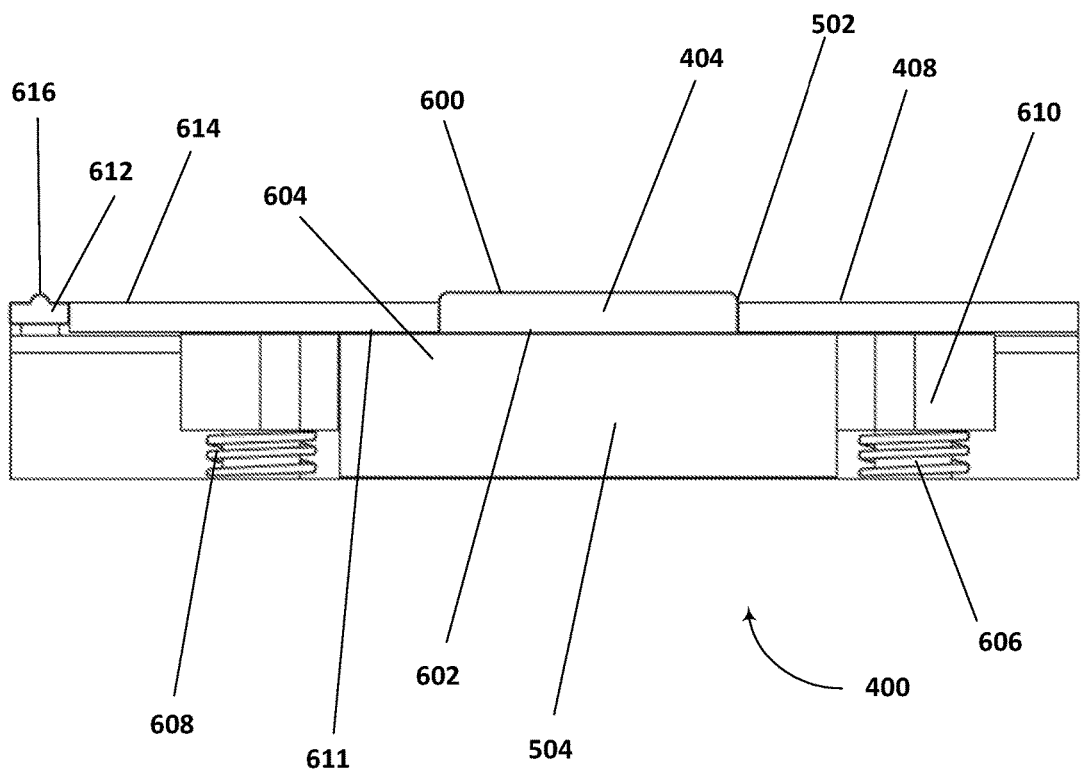
FIG. 6 depicts detail B of the example of the heat sink device of FIG. 5.

FIG. 6 depicts detail B of the example of the heat sink device 400 of FIG. 5. The Peltier device 404 includes a top 600, a bottom 602, and at least one side 604 extending between the top 600 and the bottom 602. The Peltier device 404 may be any number of shapes including, for example, square or rectangular. The top 600 of the Peltier device 404 may be exposed. Alternatively, the top 600 of the Peltier device 404 may be covered by one or more layers of material. For example, one or more layers of a no residue thermal interface material may be applied to the top 600 of the Peltier device 404.

The Peltier device 404 extends above the top 408 of the heat sink device 400. The Peltier device 404 is maintained in the raised position relative to the top 408 of the heat sink device 400 with the heat sink 504. In the example shown in FIGS. 4-6, the heat sink 504 is a spring-loaded heat sink. The heat sink 504 may be physically connected to a part of the heat sink device 400 with one or more connectors 606 (e.g., four screws or bolts) about which springs 608 are wrapped. When the connectors 606 are tightened into the part of the heat sink device 400 (e.g., one or more tapped recesses in the heat sink device 400) and thus onto the springs 608, the springs 608 press against extensions of the heat sink 504 (e.g., bosses or flanges 610). The springs 608 thus press the heat sink 504 against the part of the heat sink device 400. The spring loading of the heat sink 504 may take other forms.

The spring loading of the heat sink 504 presses a surface 611 (e.g., a bottom) of the heat sink 504 against the bottom 602 of the Peltier device 404, pushing the Peltier device 404 through the opening 502 through the top 408 of the heat sink device 400. The contact between the heat sink 504 and the Peltier device 404 keeps the Peltier device 404 in position while also allowing the Peltier device 404 to move relative to the top 408 of the heat sink device 400 when a force is applied to the Peltier device 404 (e.g., during docking of a computing device with the heat sink device 400). The movement of the Peltier device 404 relative to the top 408 of the heat sink device 400 reduces forces on the computing device during docking.

As shown in the example of FIG. 6, the heat sink device 400 also includes a transceiver module 612. The transceiver module 612 may be any number of different types of transceivers including, for example, an optical transceiver, an RF transceiver, or another type of transceiver. At least part of the transceiver module 612 extends through an opening 614 through, for example, the top 408 of the heat sink device 400. The transceiver module 612 may be located in other positions within the housing 402 of the heat sink device 400. The transceiver module 612 may be supported by the housing 402 of the heat sink device 400 in any number of ways including, for example, with an adhesive.

The part of the transceiver module 612 that extends through the opening 614 through the top 408 of the heat sink device 400 is, for example, a protrusion 616 (e.g., a pin) used to locate the computing device on the heat sink device 400. The protrusion 616 may provide a communications function (e.g., an electrical connection) in addition to the locating function. Alternatively, the protrusion 616 may only provide the locating function. For example, the transceiver module 612 may be an optical transceiver module, and the protrusion 616 may be a clear plastic part through which optical signals may be transmitted.

Signals received from the computing device via the transceiver module 612 may be transmitted to a processor of the heat sink device 400 (not shown) for processing, to the fan 506 for control, to the Peltier device 404 for control, or may be transmitted to a device external of the heat sink device 400. For example, signals received from the computing device via the transceiver module may be transmitted to an external display for processing and display of data. The signals received from the computing device via the transceiver module 612 may be transmitted via wire or wirelessly.

Figure 7:
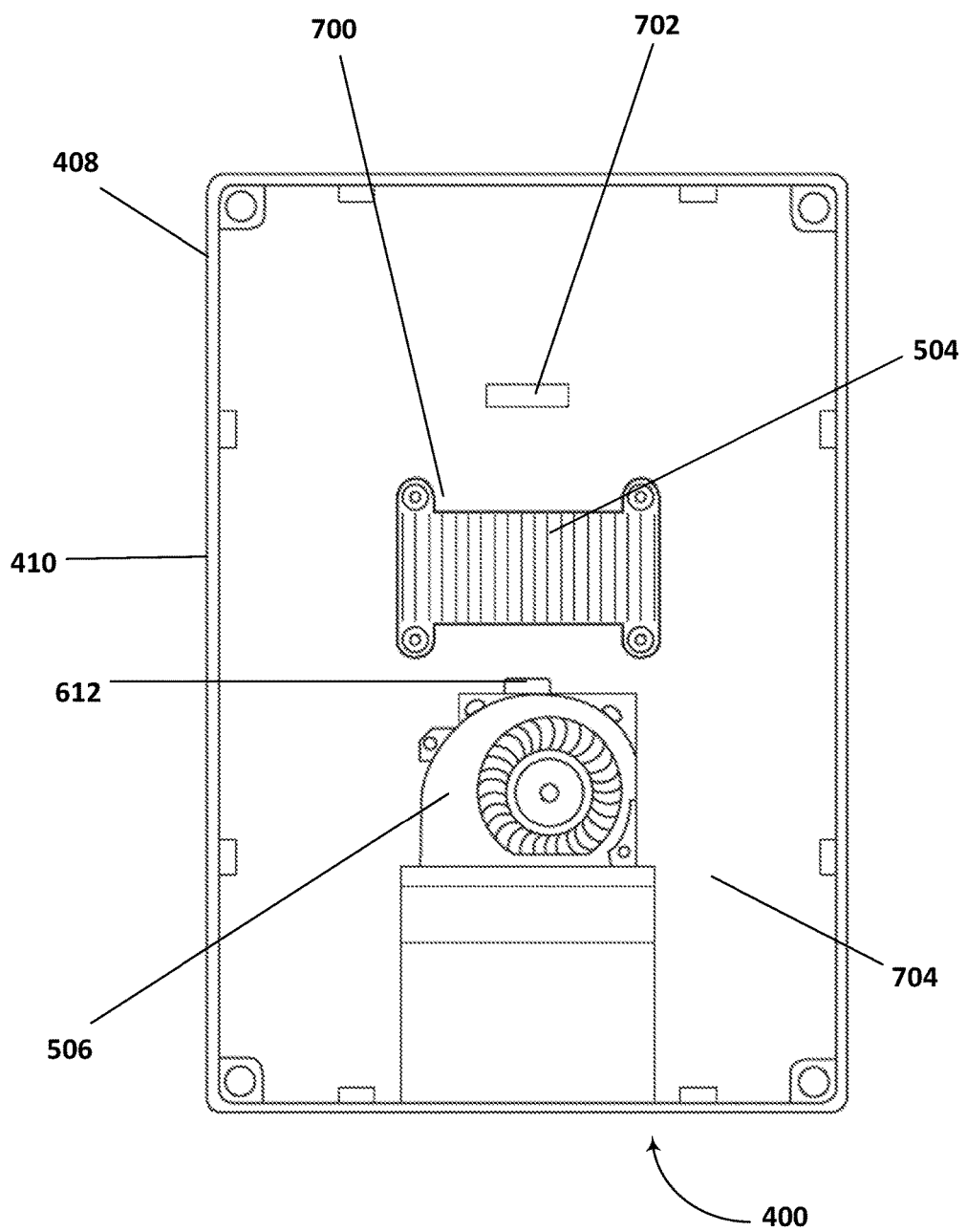
FIG. 7 depicts a bottom view of the example of the heat sink device of FIG. 4 with the bottom removed.

FIG. 7 depicts a bottom view of the example of the heat sink device 400 of FIG. 4 with the bottom 500 removed. FIG. 7 shows the fan 506 and the heat sink 504. The heat sink 504 includes a plurality of fins 700 through which air is pulled or pushed by the fan 506. The plurality of fins 700 may be any number of sizes and shapes. For example, the plurality of fins 700 include rectangular fins and/or pin fins. The plurality of fins 700 may be uniform in shape and/or size or may vary in shape and/or size. The fan 506 may be powered from a power source inside the heat sink device 400 or outside the heat sink device 400. For example, the fan 506 may be powered by batteries or a power supply unit included within the heat sink device 400, or via a cable connected to a power source outside the heat sink device 400.

The heat sink device 400 also includes one or more magnets 702 positioned at or adjacent to the top 408, the bottom 500, and/or the at least one third side 410 of the heat sink device 400. In the example shown in FIG. 7, the heat sink device 400 includes two magnets 702 (one magnet visible in FIG. 7), positioned adjacent to the top 408 of the heat sink device 400. The magnets 702 may be physically attached to an internal surface 704 of the heat sink device 400 in any number of ways including, for example, with an adhesive. The respective positions of the magnets 702 may correspond to relative positions of magnets within computing devices to be supported and cooled by the heat sink device 400. For example, a distance between the magnets 702 may be the same as a distance between magnets of the mobile phone 202, for example.

Rough alignment for data transmission from/to the transceiver module 612 is provided by the magnetic forces between the magnets 702 of the heat sink device 400 and the magnets of a computing device to be supported and cooled by the heat sink device 400 (e.g., a docked computing device). Locating features of the transceiver module 612 of the heat sink device 400 and a corresponding transceiver module of the docked computing device are used for final placement of the docked computing device and alignment between the docked computing device and the heat sink device 400.

Figure 8:
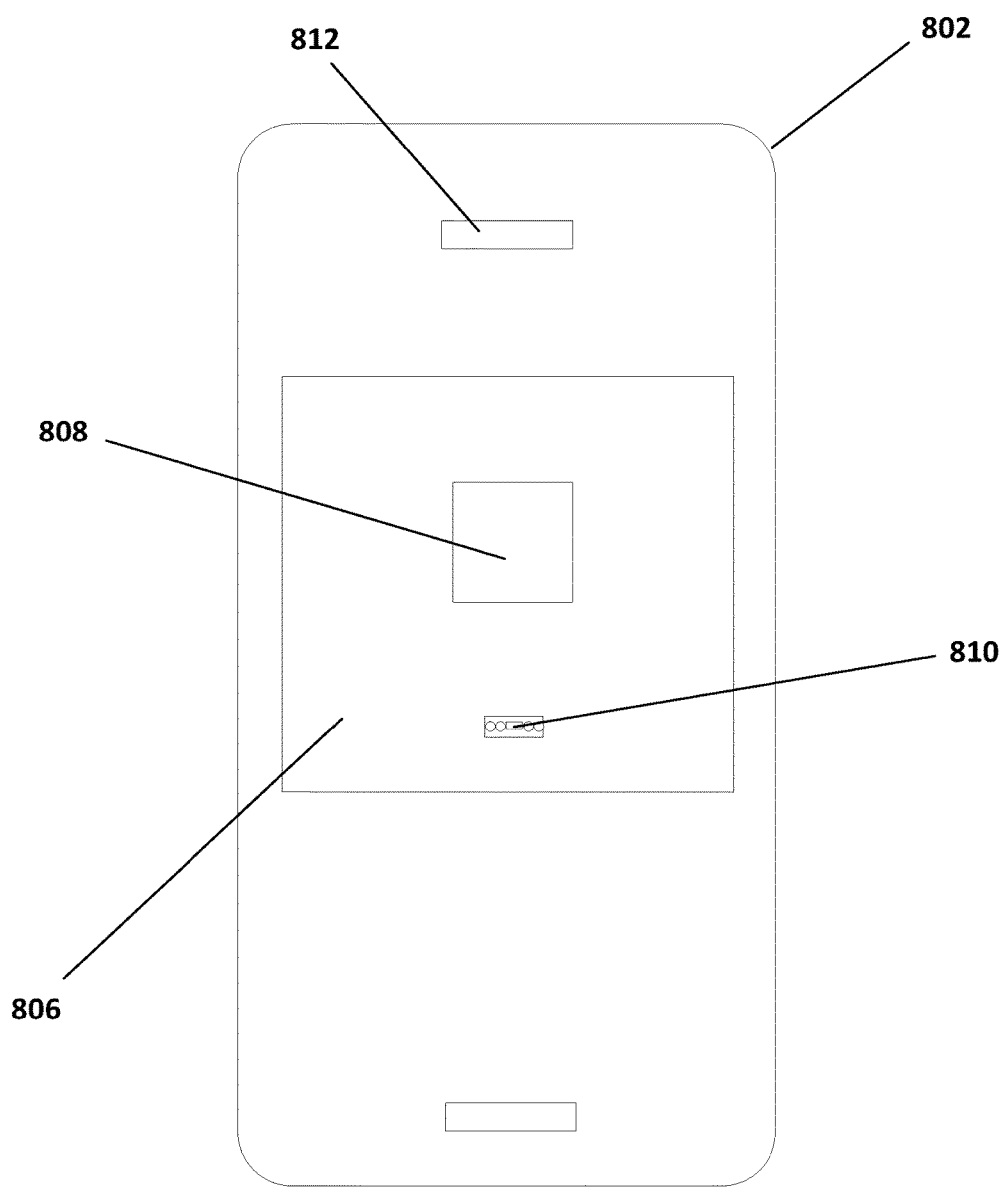
FIG. 8 depicts a bottom view of an example of a computing device with a cover removed.

FIG. 8 depicts a bottom view of an example of a computing device 800 with a cover removed. The computing device 800 is dockable on a thermal dock such as, for example, shown in FIGS. 1-7. The computing device 800 includes a housing 802. The housing 802 has a front (not shown), a back (not shown), and at least one side 804 that extends between the front and the back. The front is formed by a display, and the back is formed by a cover. The housing 802 may be any number of shapes and sizes. For example, the housing 802 is rectangular in shape and is at least partially made of aluminum or plastic.

The housing 802 supports a PCB 806 via connectors, flanges, tabs, or other supports. The PCB 806 supports at least a heat generating device 808 such as, for example, a processor, and a transceiver module 810. The PCB 806 may support more, fewer, and/or different components than shown in the example of FIG. 8. The processor 808, for example, and the transceiver module 810 are in communication via the PCB 806.

The computing device 800 also includes one or more magnets 812 (e.g., two magnets). The magnets 812 are supported by the housing 802 of the computing device 800. For example, the magnets 812 may be physically attached to the back of the computing device 800 (e.g., an internal surface of the computing device 800) with, for example, an adhesive. The magnets 812 may be physically supported by the housing 802 in other ways, including, for example, with connectors. Respective locations of the magnets 812 and spacing of the magnets 812 relative to each other may be based on spacing of corresponding magnets on the thermal dock (e.g., the heat sink device of FIGS. 4-7).

Figure 9:
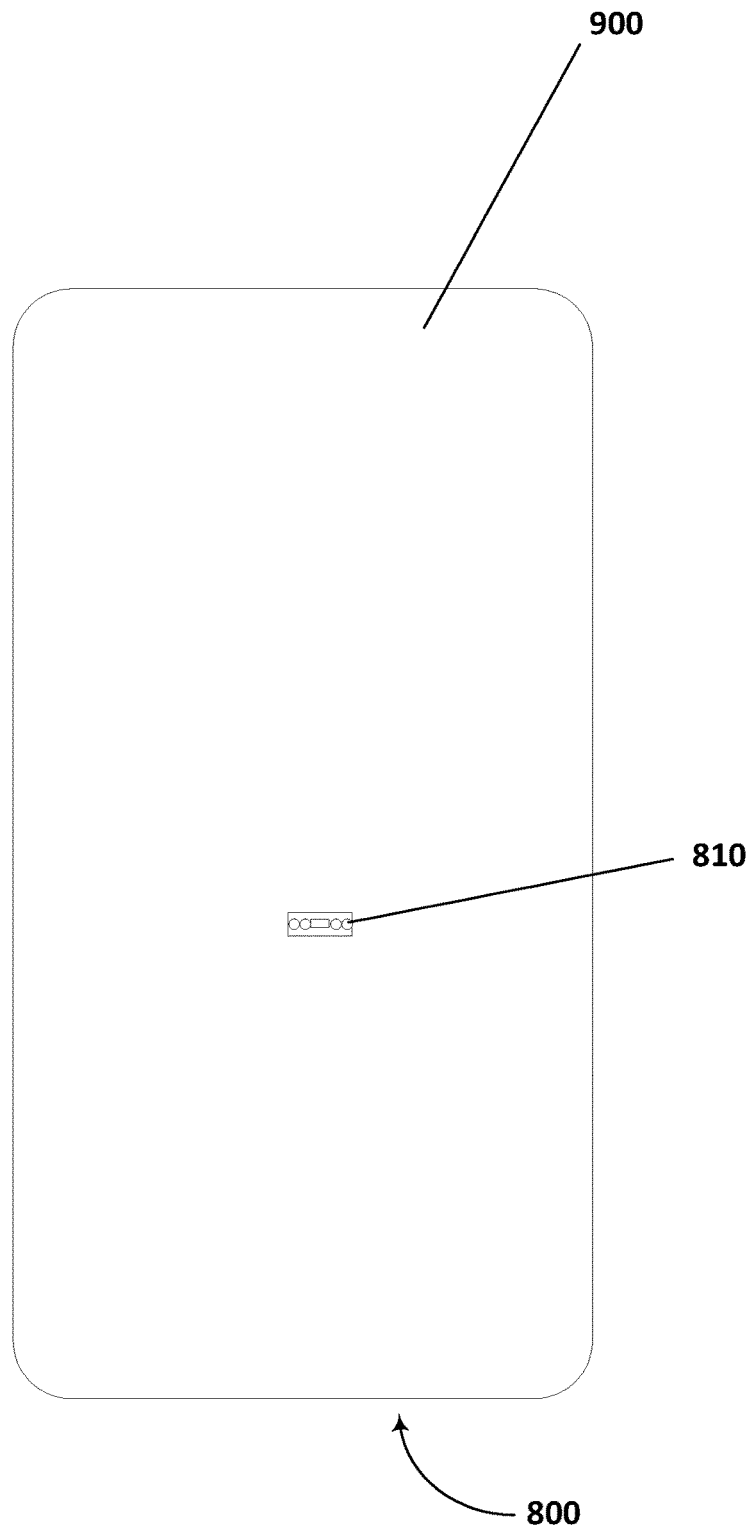
FIG. 9 depicts a bottom view of an example of the computing device of FIG. 8 with the cover included.

FIG. 9 depicts a bottom view of an example of the computing device 800 of FIG. 8 with the cover included. The computing device 800 includes a back cover 900 (e.g., forming the back of the computing device 800). The back cover 900 may be flat other than a recess or a protrusion in the transceiver module 810 for locating the computing device 800 on the thermal dock. The transceiver module 810 may be at least partially visible from outside the computing device 800 such that signals may be communicated between the transceiver module 810 of the computing device 800 and a corresponding transceiver module of the thermal dock (e.g., the transceiver module 612 of the heat sink device 400).

Figure 10:
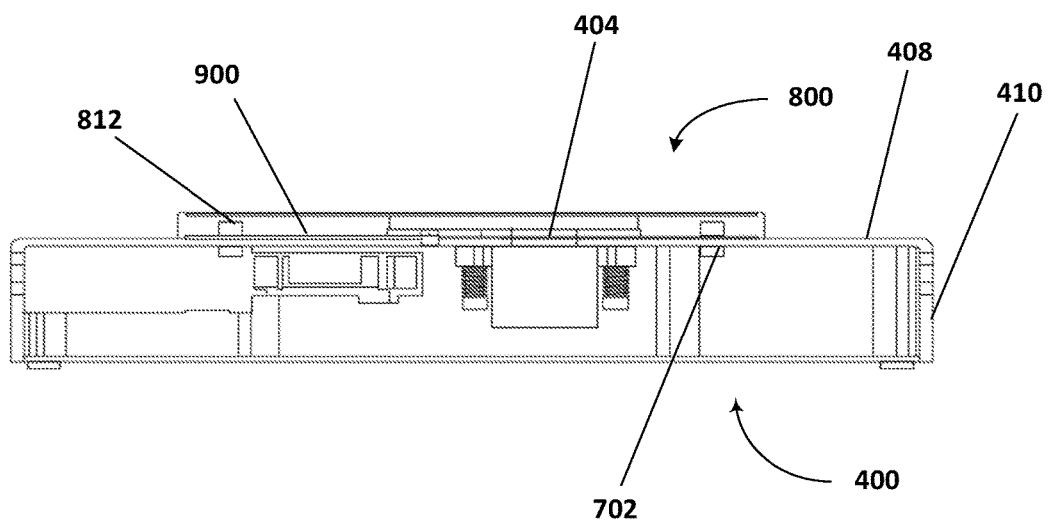
FIG. 10 depicts a side view of an exemplary docking of the computing device on the heat sink device with one of the sides removed.

FIG. 10 depicts a side view of an exemplary docking of the computing device 800 on the heat sink device 400 with one of the sides 410 removed. The back cover 900 is in physical contact with the top 408 (e.g., a top surface) of the heat sink device 400 and the Peltier device 404. The magnets 702 of the heat sink device 400 and the magnets 812 of the computing device 800 are aligned and are attracted to each other, respectively, such that the magnets 702 of the heat sink device 400 pull the magnets 812 of the computing device 800 and thus the computing device 800 itself towards the heat sink device 400.

Figure 11:
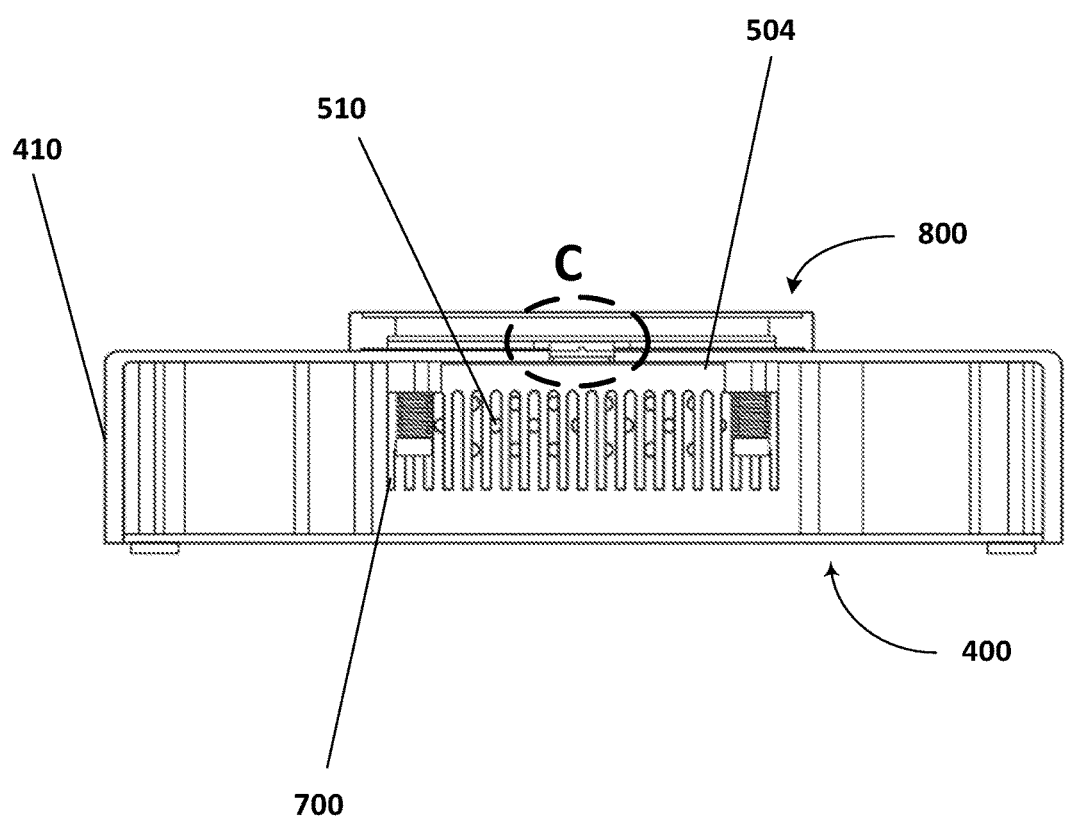
FIG. 11 depicts another side view of the exemplary docking of the computing device on the heat sink device with another one of the sides removed.

FIG. 11 depicts another side view of the exemplary docking of the computing device 800 on the heat sink device 400 with another one of the sides 410 removed. FIG. 11 illustrates the outlet vents 510 in line with the plurality of fins 700 of the heat sink 504. The fan 506 pushes cooling air between the plurality of fins 700 and out the outlet vents 510 to cool the heat sink 504 and thus the hot side of the Peltier device 404. Alternatively, the fan 506 pulls cooling air in through the vents 510, between the plurality of fins 700 of the heat sink 504, and pushes the air out vents corresponding to the fan 506 (e.g., inlet vents 512).

Figure 12:
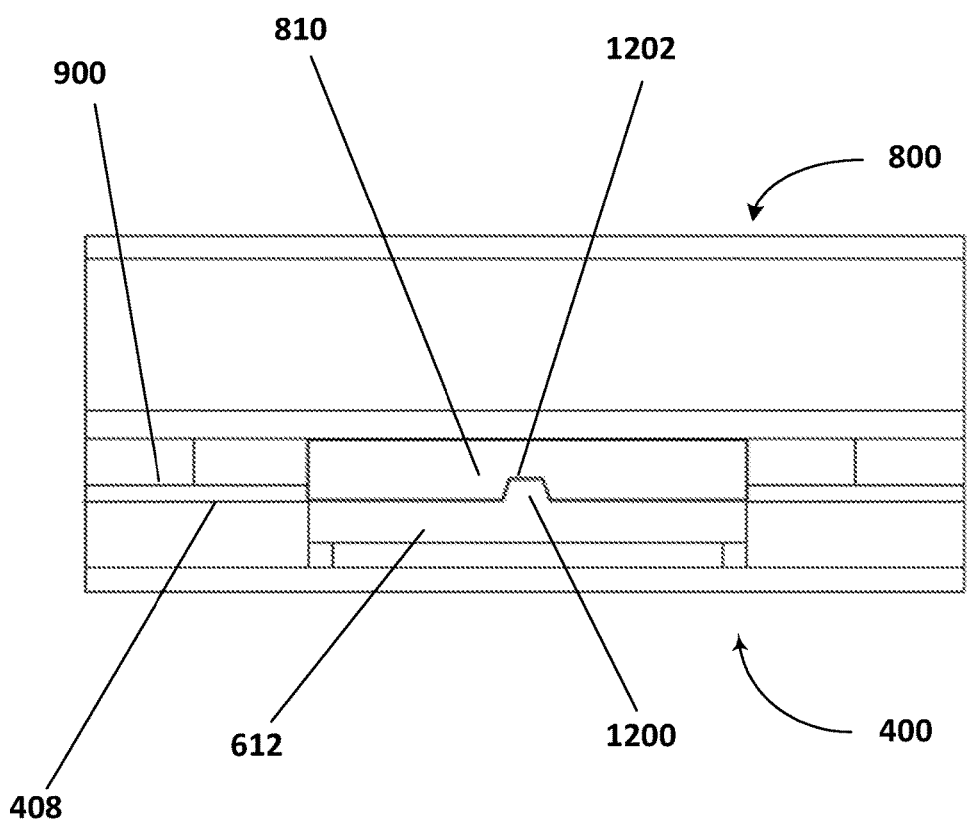
FIG. 12 depicts detail C of the exemplary docking of FIG. 11.

FIG. 12 depicts detail C of the exemplary docking of FIG. 11. The transceiver module 612 of the heat sink device 400 and the transceiver module 810 of the computing device 800 are in communication with each other (e.g., optically or via RF) and are in physical contact with each other. The transceiver module 612 of the heat sink device 400 includes a protrusion 1200, and the transceiver module 810 of the computing device 800 includes a recess 1202 into which the protrusion 1200 is positionable. In one example, the transceiver module 612 of the heat sink device 400 includes the recess 1202 and the transceiver module 810 of the computing device 800 includes the protrusion 1200. The transceiver module 810 of the computing device 800 is flush with the back cover 900 of the computing device 800 other than the recess 1202, and the transceiver module 612 of the heat sink device 400 is flush with the top 408 of the heat sink device 400 other than the protrusion 1200. The protrusion 1200 and/or the recess 1202 may be built into layers of material (e.g., plastic) covering components of the transceiver module 612 and the transceiver module 810, respectively, or the protrusion 1200 and/or the recess 1202 may be built into the components of the transceiver module 612 and the transceiver module 810, respectively.

Figure 13:
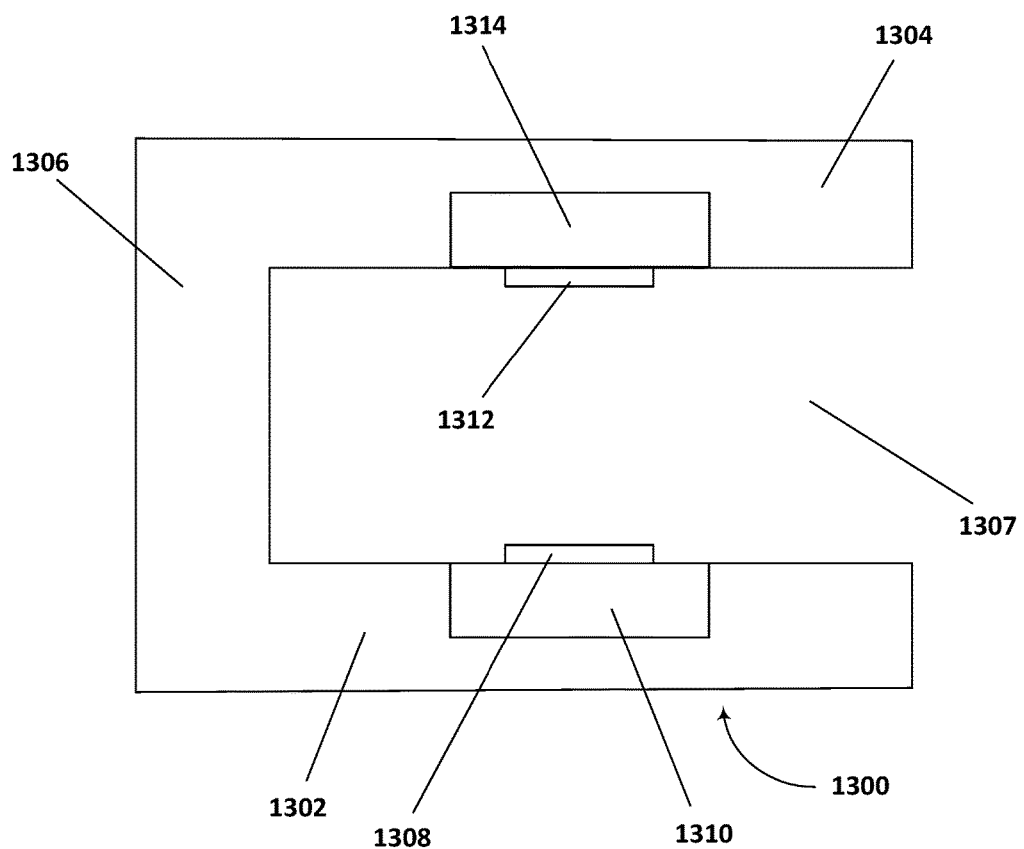
FIG. 13 depicts a side view of another example of a heat sink device.

FIG. 13 depicts a side view of another example of a heat sink device 1300 (e.g., a thermal dock). The heat sink device 1300 is C-shaped and sheath-like. The heat sink device 1300 includes a first portion 1302 (e.g., a first arm), a second portion 1304 (e.g., a second arm), and a third portion 1306 (e.g., a connector). A computing device (e.g., the computing device 800) is insertable into a slot 1307 defined by the first portion 1302, the second portion 1304, and the third portion 1306. The first portion 1302 supports a first Peltier device 1308 and a first heat sink 1310 physically connected to the first Peltier device 1308. The second portion 1304 supports a second Peltier device 1312 and a second heat sink 1314 physically connected to the second Peltier device 1312. The first Peltier device 1308 faces the second Peltier device 1312, and vice versa. When the computing device is inserted into the slot 1307, the first Peltier device 1308 and the second Peltier device 1312 may be powered on such that the first Peltier device 1308 and the second Peltier device 1312 cool the front side (e.g., the display) and the back side (e.g., the cover) of the computing device.

In other examples, the heat sink device 400 and/or the heat sink device 1300 include other active thermal management devices in addition to or instead of the Peltier device 404 and/or the first Peltier device 1308 and the second Peltier device 1312, respectively. For example, the heat sink device 400 and/or the heat sink device 1300 may include a vapor-compression refrigeration system or another type of active thermal management device.

Figure 14:
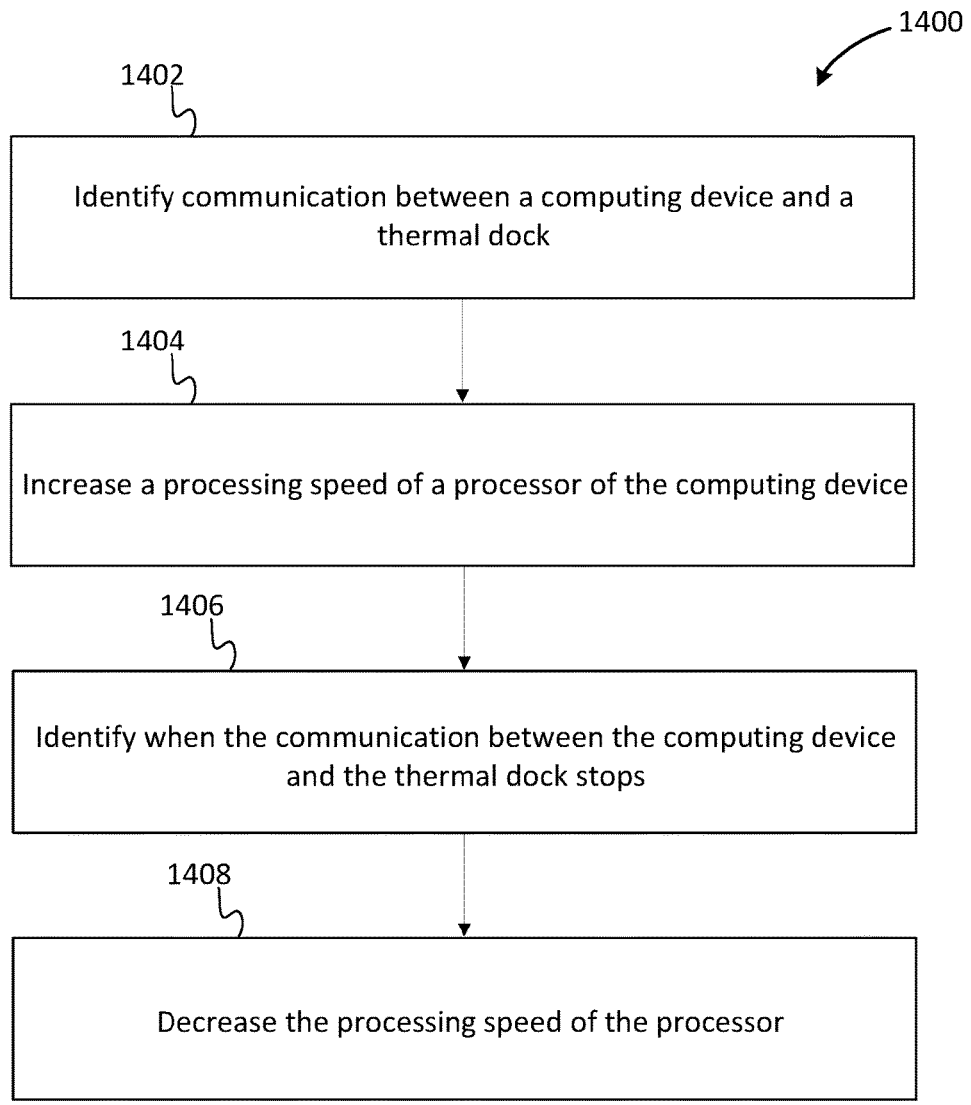
FIG. 14 is a flow diagram of a method for transferring heat from a computing device to a thermal dock in accordance with one example.

FIG. 14 shows a flowchart of one example of a method 1400 for transferring heat from a heat generating component of a computing device to a thermal management device of a thermal dock. The method 1400 is implemented in the order shown, but other orders may be used. Additional, different, or fewer acts may be provided. Similar methods may be used for transferring heat.

In act 1402, a processor of the computing device identifies communication between the computing device and a thermal dock. In one example, identifying the communication between the computing device and the thermal dock includes receiving a signal (e.g., an optical signal) from a transceiver of the thermal dock. For example, the computing device may be positioned on a top surface of the thermal dock, which includes a Peltier device at or adjacent to the top surface of the thermal dock. Proper positioning of the computing device on the top surface of the thermal dock may be facilitated by magnets on the computing device and the top surface of the thermal dock, and locating features of transceivers of the computing device and the thermal dock, respectively. In other examples, the processor of the computing device identifies communication between the computing device and the thermal dock in other ways (e.g., via one or more sensors and/or a cable connection between the computing device and the thermal dock).

The transceivers of the computing device and the thermal dock, respectively, may be optical transceivers, RF transceivers, or another type of transceivers. In one example, the computing device and the thermal dock are electrically connected via a cable connection (e.g., a user electrically connects the computing device and the thermal dock via a cable and corresponding connectors of the computing device and the thermal dock).

In act 1404, a processing speed of the processor is increased after the communication between the computing device and the thermal dock is identified. For example, after the processor receives a signal from the thermal dock indicating that the computing device is in communication with the thermal dock, the processor may allow the processor to freely increase performance (e.g., processing speed), which generates more heat. The processor may allow free increase of performance up to a maximum power generation (e.g., 10 Watts).

In one example, the method further includes powering on a Peltier device of the thermal dock and/or one or more fans of the thermal dock after the communication between the computing device and the thermal dock is identified. In one example, the processor of the computing device powers on the Peltier device of the thermal dock and/or the one or more fans of the thermal dock (e.g., instructs a power source of the thermal dock to power on the Peltier device and/or the one or more fans) after the communication between the computing device and the thermal dock is identified. In another example, a processor of the thermal dock or a processor outside of the thermal dock and the computing device powers on the Peltier device of the thermal dock and/or the one or more fans of the thermal dock. The powered on Peltier device counteracts the increase in power dissipated as heat at the computing device. The Peltier cooling keeps a case temperature of the computing device cool by refrigeration. For example, a user may still be able to touch the computing device.

The Peltier device, the one or more fans, and any other thermal management devices (e.g., a heat sink physically connected to the Peltier device, one or more phase change devices) included in the thermal dock remove heat generated by the processor. The processor may adjust a cooling capacity of the Peltier device and the one or more fans to maintain the case temperature of the computing device within human handheld temperature limits (e.g., 15 degrees Celsius to 45 degrees Celsius). For example, the computing device may include one or more temperature sensors positioned at or adjacent to an outer surface of the computing device. The one or more temperature sensors are configured to measure temperatures at or adjacent to the outer surface of the computing device, and transmit the measured temperatures to the processor. The processor may control power to the Peltier device and/or rotational speeds of the one or more fans based on the measured temperatures. The processor may adjust the thermal cooling effect to optimize power consumption of the thermal dock and the computing device. The processor will increase the cooling capacity of the Peltier device based on processing demands of the computing device.

In act 1406, the processor identifies when the communication between the computing device and the thermal dock stops. A user may remove the computing device from the thermal dock. When the computing device is removed from the thermal dock, the transceivers of the computing device and the thermal dock are no longer aligned, and the computing device no longer receives communications from the thermal dock. In other examples, one or more sensors of the computing device may determine the computing device is no longer docked on the thermal dock.

In act 1408, the processing speed of the processor is decreased after the stopping of the communication between the computing device and the thermal dock is identified. By throttling the processor, the processor lowers heat generation to keep the skin temperature within human limits.

The thermal dock is actively cooled or refrigerated below a temperature of the ambient environment. A Peltier device of the thermal dock, for example, may reduce a temperature of the thermal dock to −50 degrees Celsius or lower. If a computing device is free running or undocked, the computing device may reach temperatures of, for example, 100 degrees Celsius or more. When the computing device is docked, the cooling Peltier device will drive the skin temperature of the computing device back near the temperature of the ambient environment. In this way, a computing device such as, for example, a smart phone that generates high wattage may be docked and cooled. For example, the smart phone may usually be limited to 3 Watts. The smart phone, when docked, may dissipate, for example, 10, 15, or 25 Watts. When the smart phone, for example, is removed from the thermal dock, power for the smart phone is throttled back to a power of, for example, 3 Watts.

Figure 15:
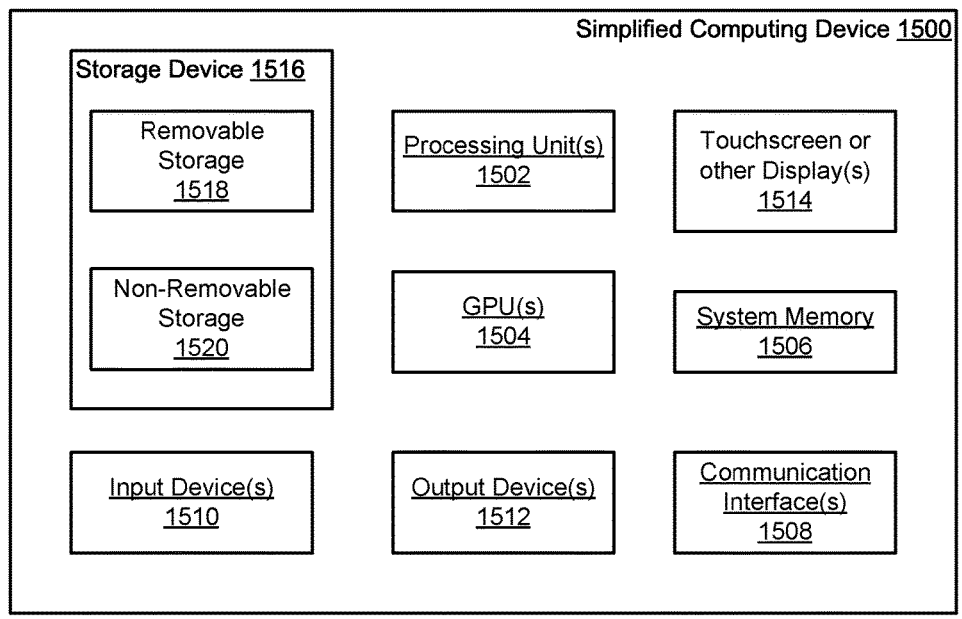
FIG. 15 is a block diagram of a computing environment in accordance with one example for implementation of the disclosed methods or one or more electronic devices.

With reference to FIG. 15, a method for cooling a computing device may be executed by an exemplary computing environment 1500. The computing environment 1500 may correspond with one of a wide variety of computing devices, including, but not limited to, personal computers (PCs), server computers, tablet and other handheld computing devices, laptop or mobile computers, communications devices such as mobile phones, multiprocessor systems, microprocessor-based systems, set top boxes, programmable consumer electronics, network PCs, minicomputers, mainframe computers, or audio or video media players. For example, the method for cooling a computing device may be executed by a computing environment of a mobile device to be cooled by a thermal dock.

The computing environment 1500 has sufficient computational capability and system memory to enable basic computational operations. In this example, the computing environment 1500 includes one or more processing units 1502, which may be individually or collectively referred to herein as a processor. The computing environment 1500 may also include one or more graphics processing units (GPUs) 1504. The processor 1502 and/or the GPU 1504 may include integrated memory and/or be in communication with system memory 1506. The processor 1502 and/or the GPU 1504 may be a specialized microprocessor, such as a digital signal processor (DSP), a very long instruction word (VLIW) processor, or other microcontroller, or may be a general purpose central processing unit (CPU) having one or more processing cores. The processor 1502, the GPU 1504, the system memory 1506, and/or any other components of the computing environment 1500 may be packaged or otherwise integrated as a system on a chip (SoC), application-specific integrated circuit (ASIC), or other integrated circuit or system.

The computing environment 1500 may also include other components, such as, for example, a communications interface 1508. One or more computer input devices 1510 (e.g., pointing devices, keyboards, audio input devices, video input devices, haptic input devices, or devices for receiving wired or wireless data transmissions) may be provided. The input devices 1510 may include one or more touch-sensitive surfaces, such as track pads. Various output devices 1512, including touchscreen or touch-sensitive display(s) 1514, may also be provided. The output devices 1512 may include a variety of different audio output devices, video output devices, and/or devices for transmitting wired or wireless data transmissions.

The computing environment 1500 may also include a variety of computer readable media for storage of information such as computer-readable or computer-executable instructions, data structures, program modules, or other data. Computer readable media may be any available media accessible via storage devices 1516 and includes both volatile and nonvolatile media, whether in removable storage 1518 and/or non-removable storage 1520. Computer readable media may include computer storage media and communication media. Computer storage media may include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the processing units of the computing environment 1500.

While the present claim scope has been described with reference to specific examples, which are intended to be illustrative only and not to be limiting of the claim scope, it will be apparent to those of ordinary skill in the art that changes, additions and/or deletions may be made to the disclosed embodiments without departing from the spirit and scope of the claims.

The foregoing description is given for clearness of understanding only, and no unnecessary limitations should be understood therefrom, as modifications within the scope of the claims may be apparent to those having ordinary skill in the art.

In a first embodiment, a thermal dock operable to cool a computing device in physical contact with the thermal dock is provided. The thermal dock includes a housing, a first thermal management device supported by the housing, and a second thermal management device physically connected to the first thermal management device. The first thermal management device is a different type of thermal management device than the second thermal management device.

In a second embodiment, with reference to the first embodiment, the first thermal management device includes a Peltier device, and the second thermal management device includes a heat sink.

In a third embodiment, with reference to the second embodiment, the housing has an outer surface on which the computing device is supportable. The Peltier device is supported by the housing such that the Peltier device extends through an opening through the housing. An outer surface of the Peltier device is offset relative to the outer surface of the housing.

In a fourth embodiment, with reference to the third embodiment, the heat sink is a spring-loaded heat sink that presses against the Peltier device, such that the outer surface of the Peltier device is offset relative to the outer surface of the housing.

In a fifth embodiment, with reference to the first embodiment, the first thermal management device has a first side, a second side, and at least one third side extending between the first side and the second side. The thermal dock further includes a third thermal management device physically connected to the first side of the first thermal management device. The second thermal management device is physically connected to the second side of the first thermal management device.

In a sixth embodiment, with reference to the fifth embodiment, the first thermal management device includes a Peltier device. The second thermal management device includes a heat sink, and the third thermal management device includes a heat spreader or a phase change device.

In a seventh embodiment, with reference to the sixth embodiment, the third thermal management device forms an outer surface of the housing on which the computing device is supportable.

In an eighth embodiment, with reference to the first embodiment, the thermal dock further includes one or more fans supported by the housing and positioned opposite the second thermal management device.

In a ninth embodiment, with reference to the eighth embodiment, the housing includes one or more vents through the housing. The one or more vents are opposite the second thermal management device.

In a tenth embodiment, with reference to the first embodiment, the thermal dock further includes a first transceiver module supported by the housing and positioned at or adjacent to an outer surface of the housing on which the computing device is supportable. The first transceiver module has a protrusion that is positionable within a corresponding recess of a second transceiver module. The computing device includes the second transceiver module.

In an eleventh embodiment, with reference to the tenth embodiment, the first transceiver module and the second transceiver module include optical transceivers, respectively.

In a twelfth embodiment, with reference to the tenth embodiment, the thermal dock further includes one or more magnets positioned at or adjacent to an outer surface of the housing on which the computing device is supportable.

In a thirteenth embodiment, with reference to the first embodiment, the thermal dock is a c-shaped sheath dock having a first portion, a second portion, and a third portion. The third portion extends between the first portion and the second portion. The first portion is opposite the second portion. The first thermal management device is supported by the second portion of the housing and faces the first portion of the housing. The thermal dock further includes a third thermal management device supported by the first portion of the housing and facing the second portion of the housing. The thermal dock also includes a fourth thermal management device physically connected to the third thermal management device. The fourth thermal management device is a different type of thermal management device than the third thermal management device.

In a fourteenth embodiment, with reference the thirteenth embodiment, the first thermal management device and the third thermal management device are Peltier devices, respectively, and the second thermal management device and the fourth thermal management device are heat sinks, respectively.

In a fifteenth embodiment, with reference to the firth embodiment, the thermal dock further includes a layer of a thermal interface material on an outer surface of the first thermal management device. The computing device is at least partly supportable by the outer surface of the first thermal management device.

In a sixteenth embodiment, a thermal management system includes a computing device and a thermal dock. The computing device includes a housing, a printed circuit board (PCB) supported by the housing of the computing device, and a heat generating component supported by the PCB. The thermal dock includes a housing and a Peltier device supported by the housing of the thermal dock, such that a surface of the Peltier device is at or adjacent to an outer surface of the housing of the thermal dock. The Peltier device is in thermal communication with the heat generating component via the housing of the computing device when the computing device is supported by the Peltier device.

In a seventeenth embodiment, with reference to the sixteenth embodiment, the computing device further includes a first heat spreader or a first phase change device physically connected to the PCB. The thermal dock further includes a second heat spreader or a second phase change device physically connected to the Peltier device. The second heat spreader or the second phase change device forms the outer surface of the housing of the thermal dock.

In an eighteenth embodiment, with reference to the seventeenth embodiment, the first heat spreader is a graphite-based heat spreader. The second heat spreader is a graphite-based heat spreader, or the first heat spreader is a graphite-based heat spreader and the second heat spreader is a graphite-based heat spreader.

In a nineteenth embodiment, with reference to the sixteenth embodiment, the surface of the Peltier device is a first surface. The Peltier device has a second surface and at least one third surface. The at least one third surface extends between the first surface and the second surface. The thermal dock further includes a heat sink physically connected to the second surface of the Peltier device. The heat sink includes a plurality of fins extending away from the second surface of the Peltier device.

In a twentieth embodiment, with reference to the sixteenth embodiment, the computing device further includes a first transceiver module. The thermal dock further includes a second transceiver module. The first transceiver module is positioned at or adjacent to an outer surface of the housing of the computing device. The second transceiver module is positioned at or adjacent to the outer surface of the housing of the thermal dock.

In a twenty-first embodiment, with reference to the twentieth embodiment, the first transceiver module has a recess, and the second transceiver module has a protrusion corresponding to the recess. The protrusion is positionable within the recess when the computing device is positioned on and supported by the outer surface of the housing of the thermal dock. Data is communicable between the computing device and the thermal dock when the protrusion is positioned within the recess.

In a twenty-second embodiment, with reference to the twenty-first embodiment, the computing device further includes one or more first magnets positioned at or adjacent to the outer surface of the housing of the computing device. The thermal dock further includes one or more second magnets positioned at or adjacent to the outer surface of the housing of the thermal dock.

In a twenty-third embodiment, a computing device includes a housing having an outer surface and an inner surface. The computing device also includes a heat generating component supported by the housing. The computing device includes a heat spreader or a phase change device physically connected to the heat generating component, and a transceiver module in electrical communication with the heat generating component. A portion of the transceiver module is at or adjacent to the outer surface of the housing. The transceiver module has a recess or a protrusion relative to the outer surface of the housing. The recess or the protrusion of the transceiver module corresponds to a protrusion or a recess of another transceiver module. The other transceiver module is a transceiver module of a thermal dock.

In a twenty-fourth embodiment, with reference to the twenty-third embodiment, the computing device further includes a PCB having a first side, a second side, and at least one third side extending between the first side and the second side. The first side of the PCB supports the heat generating component, and the second side of the PCB supports the transceiver module. The heat spreader or the phase change device is in physical contact with the second side of the PCB.

In a twenty-fifth embodiment, with reference to the twenty-third embodiment, the heat spreader is a graphite-based heat spreader.

In a twenty-sixth embodiment, with reference to the twenty-third embodiment, the phase change device is physically connected to the heat generating component. The phase change device includes a vapor chamber.

In a twenty-seventh embodiment, with reference to the twenty-third embodiment, the heat generating component includes a processor. The processor is configured to identify communication between the computing device and the thermal dock. The processor is further configured to increase a processing speed of the processor after the communication between the computing device and the thermal dock is identified. The processor is configured to identify when the communication between the computing device and the thermal dock stops. The processor is further configured to decrease the processing speed of the processor after the stopping of the communication between the computing device and the thermal dock is identified.

In a twenty-eighth embodiment, with reference to the twenty-seventh embodiment, the processor is further configured to instruct a Peltier device of the thermal dock to power on after the communication between the computing device and the thermal dock is identified.

In a twenty-ninth embodiment, with reference to the twenty-seventh embodiment, the identification of the communication between the computing device and the thermal dock includes receipt of an optical signal from the transceiver module of the thermal dock.

In a thirtieth embodiment, a method for cooling a computing device includes identifying, by a processor of the computing device, communication between the computing device and a thermal dock. A processing speed of the processor is increased after the communication between the computing device and the thermal dock is identified. The processor identifies when the communication between the computing device and the thermal dock stops. The processing speed of the processor is decreased after the stopping of the communication between the computing device and the thermal dock is identified.

In a thirty-first embodiment, with reference to the thirtieth embodiment, the method further includes powering on a Peltier device of the thermal dock after the communication between the computing device and the thermal dock is identified.

In a thirty-second embodiment, with reference to the thirty-first embodiment, the method further includes powering on one or more fans of the thermal dock after the communication between the computing device and the thermal dock is identified.

In a thirty-third embodiment, with reference to the thirtieth embodiment, the identifying of the communication between the computing device and thermal dock includes receiving an optical signal from a transceiver of the thermal dock.

In connection with any one of the aforementioned embodiments, the computing device, the thermal management system, or the method for transferring heat may alternatively or additionally include any combination of one or more of the previous embodiments.

The foregoing description is given for clearness of understanding only, and no unnecessary limitations should be understood therefrom, as modifications within the scope of the claims may be apparent to those having ordinary skill in the art.

The invention claimed is:

1. A thermal dock operable to cool a computing device in physical contact with the thermal dock, the thermal dock comprising:
a housing having an outer surface on which the computing device is supportable;
a first thermal management device supported by the housing; and
a second thermal management device physically connected to the first thermal management device,
wherein the first thermal management device is a different type of thermal management device than the second thermal management device,
wherein the first thermal management device comprises a Peltier device, and
wherein the Peltier device is supported by the housing such that the Peltier device extends through an opening through the housing, an outer surface of the Peltier device being offset relative to the outer surface of the housing.

2. The thermal dock of claim 1, wherein the second thermal management device comprises a heat sink.

3. The thermal dock of claim 2, wherein the heat sink is a spring-loaded heat sink that presses against the Peltier device, such that the outer surface of the Peltier device is offset relative to the outer surface of the housing.

4. The thermal dock of claim 1, wherein the first thermal management device has a first side, a second side, and at least one third side extending between the first side and the second side,
wherein the thermal dock further comprises a third thermal management device physically connected to the first side of first thermal management device, the second thermal management device being physically connected to the second side of the first thermal management device.

5. The thermal dock of claim 4, wherein the second thermal management device comprises a heat sink, and the third thermal management device comprises a heat spreader or a phase change device.

6. The thermal dock of claim 5, wherein the third thermal management device forms the outer surface of the housing on which the computing device is supportable.

7. The thermal dock of claim 1, further comprising a first transceiver module supported by the housing and positioned at or adjacent to the outer surface of the housing on which the computing device is supportable,
wherein the first transceiver module has a protrusion that is positionable within a corresponding recess of a second transceiver module, the computing device comprising the second transceiver module.

8. The thermal dock of claim 1, wherein the thermal dock is a c-shaped sheath dock having a first portion, a second portion, and a third portion extending between the first portion and the second portion, the first portion being opposite the second portion,
wherein the first thermal management device is supported by the second portion of the housing and faces the first portion of the housing, and
wherein the thermal dock further comprises:
a third thermal management device supported by the first portion of the housing and facing the second portion of the housing; and
a fourth thermal management device physically connected to the third thermal management device, the fourth thermal management device being a different type of thermal management device than the third thermal management device.

9. The thermal dock of claim 8, wherein the third thermal management device is a Peltier device, and the second thermal management device and the fourth thermal management device are heat sinks, respectively.

10. The thermal dock of claim 1, further comprising a magnet positioned adjacent to the outer surface, the magnet positioned to align a computing device with the thermal dock.

11. A thermal management system comprising:
a computing device comprising:
a housing;
a printed circuit board (PCB) supported by the housing of the computing device;
a heat generating component supported by the PCB; and
a thermal dock comprising:
a housing; and
a Peltier device supported by the housing of the thermal dock, such that a surface of the Peltier device is at or adjacent to an outer surface of the housing of the thermal dock,
wherein the Peltier device is in thermal communication with the heat generating component via the housing of the computing device when the computing device is supported by the Peltier device, and
wherein the thermal dock further comprises a heat spreader or a phase change device physically connected to the Peltier device, the heat spreader or the phase change device forming the outer surface of the housing of the thermal dock.

12. The thermal management system of claim 11, wherein the heat spreader is a first heat spreader, and the phase change device is a first phase change device,
wherein the computing device further comprises a second heat spreader or a second phase change device physically connected to the PCB.

13. The thermal management system of claim 11, wherein the surface of the Peltier device is a first surface, the Peltier device having a second surface and at least one third surface, the at least one third surface extending between the first surface and the second surface,
wherein the thermal dock further comprises a heat sink physically connected to the second surface of the Peltier device, the heat sink comprising a plurality of fins extending away from the second surface of the Peltier device.

14. The thermal management system of claim 11, wherein the computing device further comprises a first transceiver module, and the thermal dock further comprises a second transceiver module,
wherein the first transceiver module is positioned at or adjacent to an outer surface of the housing of the computing device, and
wherein the second transceiver module is positioned at or adjacent to the outer surface of the housing of the thermal dock.

15. The thermal management system of claim 14, wherein the first transceiver module has a recess, and the second transceiver module has a protrusion corresponding to the recess, and
wherein the protrusion is positionable within the recess when the computing device is positioned on and supported by the outer surface of the housing of the thermal dock, data being communicable between the computing device and the thermal dock when the protrusion is positioned within the recess.

16. The thermal management system of claim 11, wherein the computing device includes a first magnet and the thermal dock includes a second magnet, the first magnet and the second magnet being attracted to each other.

17. A computing device comprising:
a housing having an outer surface and an inner surface;
a heat generating component supported by the housing;
a heat spreader or a phase change device physically connected to the heat generating component;
a transceiver module in electrical communication with the heat generating component, a portion of the transceiver module being at or adjacent to the outer surface of the housing,
wherein the transceiver module has a recess or a protrusion relative to the outer surface of the housing, the recess or the protrusion of the transceiver module corresponding to a protrusion or a recess of another transceiver module, the other transceiver module being a transceiver module of a thermal dock.

18. The computing device of claim 17, wherein the phase change device is physically connected to the heat generating component, the phase change device comprising a vapor chamber.

19. The computing device of claim 17, wherein the heat generating component comprises a processor, the processor configured to:
identify communication between the computing device and the thermal dock;
increase a processing speed of the processor after the communication between the computing device and the thermal dock is identified;
identify when the communication between the computing device and the thermal dock stops; and
decrease the processing speed of the processor after the stopping of the communication between the computing device and the thermal dock is identified.

20. The computing device of claim 19, wherein the processor is further configured to instruct a Peltier device of the thermal dock to power on after the communication between the computing device and the thermal dock is identified.

21. The computing device of claim 19, wherein the identification of the communication between the computing device and the thermal dock comprises receipt of an optical signal from the transceiver module of the thermal dock.

22. The thermal management system of claim 17, wherein the computing device includes a first magnet and the thermal dock includes a second magnet, the first magnet and the second magnet being attracted to each other such that when the first magnet and the second magnet are aligned, the recess or the protrusion of the transceiver module corresponds to the protrusion or a recess of the other transceiver module.

* * * * *